(12) United States Patent
Wada

(10) Patent No.: US 12,067,789 B2
(45) Date of Patent: Aug. 20, 2024

(54) VEHICLE CONTROL SYSTEM AND DELIMITING LINE ESTIMATING METHOD

(71) Applicant: HONDA MOTOR CO., LTD., Tokyo (JP)

(72) Inventor: Koichiro Wada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 399 days.

(21) Appl. No.: 17/559,082

(22) Filed: Dec. 22, 2021

(65) Prior Publication Data

US 2022/0207886 A1 Jun. 30, 2022

(30) Foreign Application Priority Data

Dec. 28, 2020 (JP) ................................. 2020-219115

(51) Int. Cl.
*G06V 20/56* (2022.01)
*B60W 30/18* (2012.01)

(52) U.S. Cl.
CPC ..... *G06V 20/588* (2022.01); *B60W 30/18036* (2013.01); *B60W 2420/403* (2013.01); *B60W 2552/53* (2020.02)

(58) Field of Classification Search
None
See application file for complete search history.

(56) References Cited

U.S. PATENT DOCUMENTS

| 2007/0198146 A1* | 8/2007 | Ikeda | .................. H04N 7/18 701/23 |
|---|---|---|---|
| 2020/0103234 A1* | 4/2020 | Fujiya | .................. G01C 21/28 |

FOREIGN PATENT DOCUMENTS

JP 3584194 B2 11/2004

OTHER PUBLICATIONS

Kang et al ( Lane Leve; Map matching method for vehicle localization using GPS and camera on a high definition map ) (Year: 2020 ).*

* cited by examiner

*Primary Examiner* — Nancy Bitar
(74) *Attorney, Agent, or Firm* — Armstrong Teasdale LLP

(57) ABSTRACT

A vehicle control system includes an imaging device configured to capture an image of a travel route on which a vehicle is traveling, and a delimiting line estimating unit configured to estimate a position of a delimiting line on the travel route based on the image captured by the imaging device. The delimiting line estimating unit is configured to generate a first delimiting point sequence, generate a second delimiting point sequence that is offset rearward in a vehicle travel direction with respect to the first delimiting point sequence, generate a corrected delimiting point sequence based on the first delimiting point sequence and the second delimiting point sequence, and estimate the position of the delimiting line on the travel route based on the corrected delimiting point sequence.

8 Claims, 7 Drawing Sheets

● reference point locus

VEHICLE CONTROL SYSTEM AND DELIMITING LINE ESTIMATING METHOD

TECHNICAL FIELD

The present invention relates to a vehicle control system and a delimiting line estimating method.

BACKGROUND ART

Conventionally, various techniques have been proposed for estimating a position of a delimiting line on a travel route based on an image captured by an imaging device. For example, a technique disclosed in Japanese Patent No. 3584194 superimposes a differential image generated from a previous image of a delimiting line (white line) on a differential image generated from a current image of the delimiting line, calculates a straight line that approximates a candidate point sequence of the delimiting line on the above superimposed differential image, and estimates the position of the straight line as the position of the delimiting line.

In the above technique, the position of the delimiting line can be estimated only in a section where the previous image of the delimiting line is superimposed on the current image of the delimiting line. Accordingly, the distance of the section where the position of the delimiting line can be estimated becomes insufficient, which may make it difficult to accurately estimate an own vehicle position on a map by comparing the estimated position of the delimiting line with the position of the delimiting line on the map.

SUMMARY OF THE INVENTION

In view of the above background, an object of the present invention is to provide a vehicle control system and a delimiting line estimating method that can sufficiently ensure the distance of a section where the position of a delimiting line can be estimated.

To achieve such an object, one aspect of the present invention provides a vehicle control system (1), comprising: an imaging device (18) configured to capture an image of a travel route on which a vehicle (V) is traveling; and a delimiting line estimating unit (31) configured to estimate a position of a delimiting line on the travel route based on the image captured by the imaging device, wherein the delimiting line estimating unit is configured to generate a first delimiting point sequence (P1) based on the image captured by the imaging device when the vehicle is traveling in a first position (A1), generate a second delimiting point sequence (P2) based on the image captured by the imaging device when the vehicle is traveling in a second position (A2) arranged more rearward than the first position in a vehicle travel direction, the second delimiting point sequence being offset rearward in the vehicle travel direction with respect to the first delimiting point sequence, generate a corrected delimiting point sequence (P3) based on the first delimiting point sequence and the second delimiting point sequence, the corrected delimiting point sequence extending more rearward in the vehicle travel direction than the first delimiting point sequence, and estimate the position of the delimiting line on the travel route based on the corrected delimiting point sequence.

According to this aspect, the position of the delimiting line on the travel route is estimated based on the corrected delimiting point sequence that extends more rearward in the vehicle travel direction than the first delimiting point sequence. Accordingly, it is possible to extend the distance of a section where the position of the delimiting line on the travel route can be estimated as compared with a case where the position of the delimiting line on the travel route is estimated based on the first delimiting point sequence itself. Further, the position of the delimiting line on the travel route is estimated based on not only the first delimiting point sequence but also the second delimiting point sequence. Accordingly, it is possible to prevent the estimation accuracy of the position of the delimiting line on the travel route from decreasing due to the noise contained in the image captured by the imaging device when the vehicle is traveling in the first position.

In the above aspect, preferably, the first delimiting point sequence, the second delimiting point sequence, and the corrected delimiting point sequence include a plurality of first delimiting points (Q1), a plurality of second delimiting points (Q2), and a plurality of corrected delimiting points (Q3) respectively, and the delimiting line estimating unit is configured to generate the corrected delimiting point sequence in an overlapping section (B) such that a ratio of a first distance to a second distance is constant, the overlapping section being a section in which the positions of the first delimiting point sequence and the second delimiting point sequence in the vehicle travel direction overlap with each other, the first distance being a distance from each first delimiting point to each corrected delimiting point, the second distance being a distance from each second delimiting point to each corrected delimiting point.

According to this aspect, in the overlapping section, the corrected delimiting point sequence can be generated at an appropriate position.

In the above aspect, preferably, the delimiting line estimating unit is configured to generate the corrected delimiting point sequence in a non-overlapping section (C1, C2) such that a third distance and a fourth distance match each other, the non-overlapping section being a section in which the positions of the first delimiting point sequence and the second delimiting point sequence in the vehicle travel direction do not overlap with each other, the third distance being a distance from one of the first delimiting point and the second delimiting point to the corrected delimiting point at a closest position to the non-overlapping section in the overlapping section, the fourth distance being a distance from the one of the first delimiting point and the second delimiting point to the corrected delimiting point in the non-overlapping section.

According to this aspect, not only in the overlapping section but also in the non-overlapping section, the corrected delimiting point sequence can be generated at an appropriate position.

In the above aspect, preferably, the first delimiting point sequence includes a reference point (R) which is a point right next to the vehicle, and the delimiting line estimating unit is configured to generate a reference point locus which is a locus of the reference point, calculate a rotational correction amount of the corrected delimiting point sequence according to a deviation amount of the corrected delimiting point sequence from the reference point locus, rotate the corrected delimiting point sequence by the rotational correction amount, and estimate the position of the delimiting line on the travel route based on the corrected delimiting point sequence that has been rotated.

According to this aspect, it is possible to suppress the deviation of an angle of the corrected delimiting point sequence from an angle of the delimiting line on the travel route.

In the above aspect, preferably, in a case where the rotational correction amount exceeds a prescribed threshold, the delimiting line estimating unit removes an excess of the rotational correction amount over the threshold.

According to this aspect, by keeping the rotational correction amount of the corrected delimiting point sequence within the threshold, it is possible to prevent the position of the corrected delimiting point sequence after rotation from being excessively deviated from the position of the corrected delimiting point sequence before rotation.

In the above aspect, preferably, the imaging device includes an external camera, and the delimiting line estimating unit is configured to determine whether a camera delimiting line is valid, the camera delimiting line being the delimiting line recognized based on an image captured by the external camera, and generate the corrected delimiting point sequence only when determining that the camera delimiting line is valid.

According to this aspect, it is possible to prevent the corrected delimiting point sequence from being generated based on a camera delimiting line whose validity is insufficient (for example, a camera delimiting line whose length is insufficient).

In the above aspect, preferably, the vehicle control system further comprises a travel control unit (42) configured to execute lane keeping assistance control based on the position of the delimiting line on the travel route estimated by the delimiting line estimating unit.

According to this aspect, the lane keeping assistance control can be executed based on the position of the delimiting line on the travel route that is accurately estimated based on the corrected delimiting point sequence. Accordingly, the effectiveness of the lane keeping assistance control can be enhanced.

In the above aspect, preferably, the vehicle control system further comprises a map generating unit (53) configured to generate a map of a surrounding area of the vehicle, and an own vehicle position estimating unit (54) configured to estimate a position of the vehicle on the map by comparing the position of the delimiting line on the travel route estimated by the delimiting line estimating unit with the position of the delimiting line on the map.

According to this aspect, the position of the delimiting line on the travel route estimated based on the corrected delimiting point sequence (the delimiting point sequence extending more rearward in the vehicle travel direction than the first delimiting point sequence) is compared with the position of the delimiting line on the map. Accordingly, it is possible to sufficiently ensure the comparing distance of these two positions, so that it is possible to accurately estimate the position of the vehicle on the map.

To achieve the above object, another aspect of the present invention provides a delimiting line estimating method for estimating a position of a delimiting line on a travel route on which a vehicle (V) is traveling, the delimiting line estimating method comprising: generating a first delimiting point sequence (P1) based on an image captured when the vehicle is traveling in a first position (A1), generating a second delimiting point sequence (P2) based on an image captured when the vehicle is traveling in a second position (A2) arranged more rearward than the first position in a vehicle travel direction, the second delimiting point sequence being offset rearward in the vehicle travel direction with respect to the first delimiting point sequence, generating a corrected delimiting point sequence (P3) based on the first delimiting point sequence and the second delimiting point sequence, the corrected delimiting point sequence extending more rearward in the vehicle travel direction than the first delimiting point sequence, and estimating the position of the delimiting line on the travel route based on the corrected delimiting point sequence.

According to this aspect, the position of the delimiting line on the travel route is estimated based on the corrected delimiting point sequence that extends more rearward in the vehicle travel direction than the first delimiting point sequence. Accordingly, it is possible to extend the distance of a section where the position of the delimiting line on the travel route can be estimated as compared with a case where the position of the delimiting line on the travel route is estimated based on the first delimiting point sequence itself. Further, the position of the delimiting line on the travel route is estimated based on not only the first delimiting point sequence but also the second delimiting point sequence. Accordingly, it is possible to prevent the estimation accuracy of the position of the delimiting line on the travel route from decreasing due to the noise contained in the image captured by the imaging device at the first position.

Thus, according to the above aspects, it is possible to provide a vehicle control system and a delimiting line estimating method that can sufficiently ensure the distance of a section where the position of a delimiting line can be estimated.

BRIEF DESCRIPTION OF THE DRAWING(S)

DETAILED DESCRIPTION OF THE INVENTION

Figure 1:
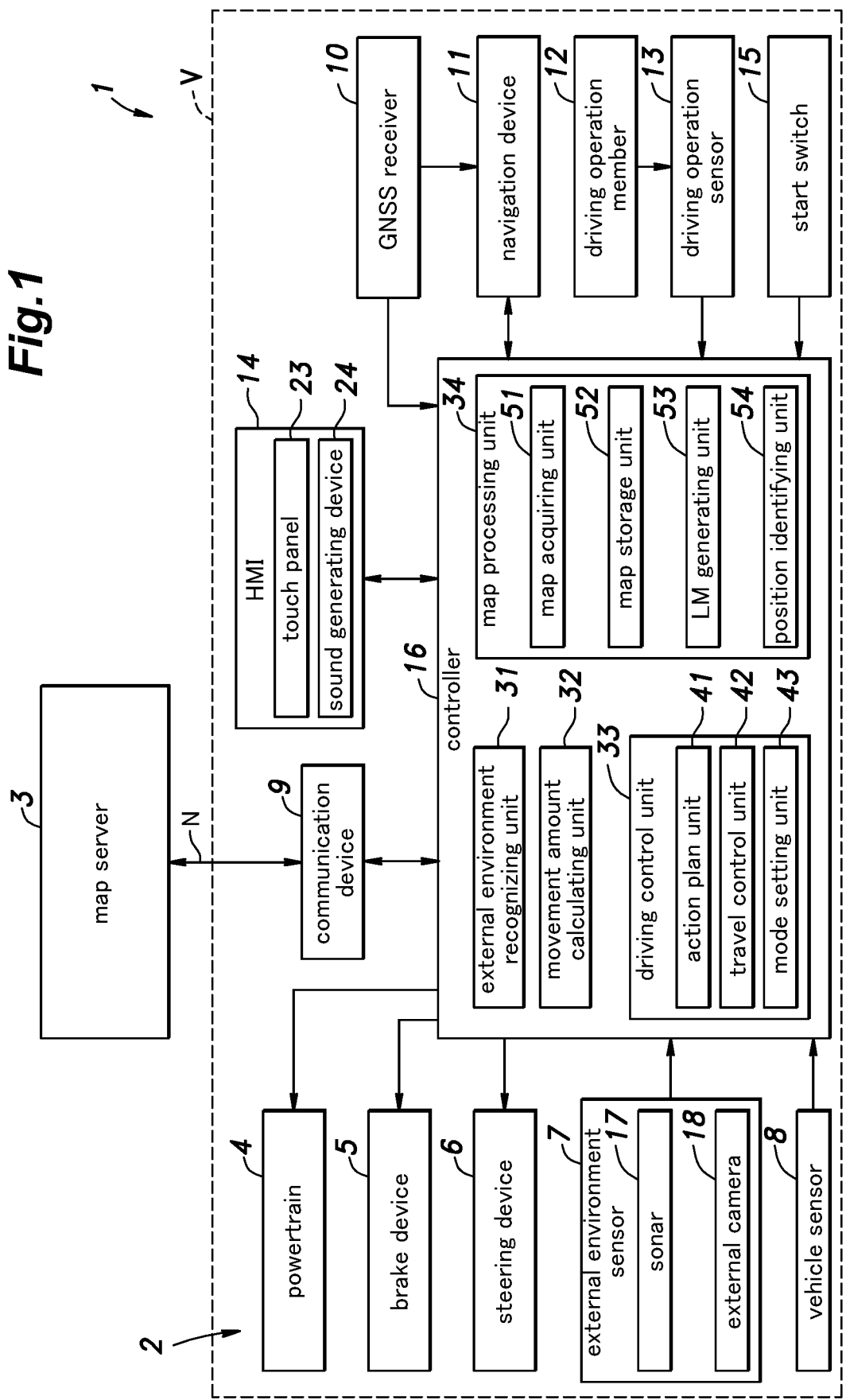
FIG. 1 is a block diagram of a vehicle control system according to an embodiment of the present invention.

In the following, a vehicle control system 1 according to an embodiment of the present invention will be described with reference to the drawings. As shown in FIG. 1, the vehicle control system 1 includes a vehicle system 2 mounted on a vehicle V, and a high-precision map server 3 (hereinafter, abbreviated as "the map server 3") connected to the vehicle system 2 via a network N. Hereinafter, the word "the vehicle V" indicates a vehicle (namely, the own vehicle) provided with the vehicle system 2.

<The Vehicle System 2>

First, the vehicle system 2 will be described. The vehicle system 2 includes a powertrain 4, a brake device 5, a steering device 6, an external environment sensor 7, a vehicle sensor 8, a communication device 9, a GNSS receiver 10, a navigation device 11, a driving operation member 12, a driving operation sensor 13, an HMI 14, a start switch 15, and a controller 16. Each component of the vehicle system 2 is connected to each other via a communication means such as Controller Area Network (CAN) such that signals can be transmitted therebetween.

The powertrain 4 is a device configured to apply a driving force to the vehicle V. For example, the powertrain 4 includes at least one of an internal combustion engine (such as a gasoline engine and a diesel engine) and an electric motor. The brake device 5 is a device configured to apply a brake force to the vehicle V. For example, the brake device 5 includes a brake caliper configured to press a pad against a brake rotor and an electric cylinder configured to supply an oil pressure to the brake caliper. The brake device 5 may further include a parking brake device configured to restrict rotation of wheels via wire cables. The steering device 6 is a device configured to change the steering angles of the wheels. For example, the steering device 6 includes a rack-and-pinion mechanism configured to steer the wheels and an electric motor configured to drive the rack-and-pinion mechanism. The powertrain 4, the brake device 5, and the steering device 6 are controlled by the controller 16.

The external environment sensor 7 is a sensor configured to detect an object outside the vehicle V or the like by capturing electromagnetic waves, sound waves, or the like from the surroundings of the vehicle V. The external environment sensor 7 includes a plurality of sonars 17 and a plurality of external cameras 18 (an example of an imaging device). The external environment sensor 7 may further include a millimeter wave radar and/or a laser lidar. The external environment sensor 7 is configured to output a detection result to the controller 16.

Each sonar 17 consists of a so-called ultrasonic sensor. The sonar 17 emits ultrasonic waves to the surroundings of the vehicle V and captures the reflected waves therefrom, thereby detecting a position (distance and direction) of the object. The plurality of sonars 17 are provided at a rear part and a front part of the vehicle V, respectively.

Each external camera 18 is a device configured to capture an image of the surroundings of the vehicle V. For example, the external camera 18 is a digital camera that uses a solid imaging element such as a CCD and a CMOS. The external camera 18 may consist of a stereo camera or a monocular camera. The plurality of external cameras 18 include a front camera configured to capture an image in front of the vehicle V, a rear camera configured to capture an image behind the vehicle V, and a pair of side cameras configured to capture images on both lateral sides of the vehicle V. When the vehicle V is traveling, each external camera 18 captures an image of a travel route on which the vehicle V is traveling at prescribed intervals (for example, at prescribed spatial intervals or prescribed temporal intervals).

The vehicle sensor 8 is a sensor configured to detect the state of the vehicle V. The vehicle sensor 8 includes a vehicle speed sensor configured to detect the speed of the vehicle V, an acceleration sensor configured to detect the acceleration of the vehicle V, a yaw rate sensor configured to detect the angular velocity around a vertical axis of the vehicle V, a direction sensor configured to detect the direction of the vehicle V, and the like. For example, the yaw rate sensor consists of a gyro sensor. The vehicle sensor 8 may further include an inclination sensor configured to detect the inclination of a vehicle body and a wheel speed sensor configured to detect the rotational speed of each wheel.

The communication device 9 is configured to mediate communication between the controller 16 and a device (for example, the map server 3) outside the vehicle V. The communication device 9 includes a router configured to connect the controller 16 to the Internet. The communication device 9 may have a wireless communication function of mediating wireless communication between the controller 16 of the vehicle V and the controller of the surrounding vehicle and between the controller 16 of the vehicle V and a roadside device on a road.

The GNSS receiver 10 is configured to receive a signal (hereinafter referred to as "the GNSS signal") relating to the position (latitude and longitude) of the vehicle V from each of satellites that constitute a Global Navigation Satellite System (GNSS). The GNSS receiver 10 is configured to output the received GNSS signal to the navigation device 11 and the controller 16.

The navigation device 11 consists of a computer provided with known hardware. The navigation device 11 is configured to identify the position (latitude and longitude) of the vehicle V based on the previous traveling history of the vehicle V and the GNSS signal output from the GNSS receiver 10. The navigation device 11 is configured to store data (hereinafter referred to as "the navigation map data") on roads of a region or a country on which the vehicle V is traveling. The navigation device 11 is configured to store the navigation map data in a RAM, an HDD, an SSD, or the like.

The navigation device 11 is configured to set, based on the GNSS signal and the navigation map data, a route from a current position of the vehicle V to a destination input by an occupant, and output the route to the controller 16. When the vehicle V starts traveling, the navigation device 11 provides the occupant with route guidance to the destination.

The driving operation member 12 is provided in a vehicle cabin and configured to accept an input operation the occupant performs to control the vehicle V. The driving operation member 12 includes a steering wheel, an accelerator pedal, and a brake pedal. The driving operation member 12 may further include a shift lever, a parking brake lever, a blinker lever, and the like.

The driving operation sensor 13 is a sensor configured to detect an operation amount of the driving operation member 12. The driving operation sensor 13 includes a steering angle sensor configured to detect an operation amount of the steering wheel, an accelerator sensor configured to detect an operation amount of the accelerator pedal, and a brake sensor configured to detect an operation amount of the brake pedal. The driving operation sensor 13 is configured to output the detected operation amount to the controller 16. The driving operation sensor 13 may further include a grip sensor configured to detect that the occupant grips the steering wheel. For example, the grip sensor consists of at least one capacitive sensor provided on an outer circumferential portion of the steering wheel.

The HMI 14 is configured to notify the occupant of various kinds of information by display and/or voice, and accept an input operation by the occupant. For example, the HMI 14 includes a touch panel 23 and a sound generating device 24. The touch panel 23 includes a liquid crystal display, an organic EL display, or the like, and is configured to accept the input operation by the occupant. The sound generating device 24 consists of a buzzer and/or a speaker. The HMI 14 is configured to display a driving mode switch button on the touch panel 23. The driving mode switch button is a button configured to accept a switching operation of a driving mode (for example, an autonomous driving mode and a manual driving mode) of the vehicle V by the occupant.

The HMI 14 also functions as an interface to mediate the input to/the output from the navigation device 11. Namely, when the HMI 14 accepts the input operation of the destination by the occupant, the navigation device 11 starts a route setting to the destination. Further, when the navigation device 11 provides the route guidance to the destination, the HMI 14 displays the current position of the vehicle V and the route to the destination.

The start switch 15 is a switch for starting the vehicle system 2. Namely, the occupant presses the start switch 15 while sitting on the driver's seat and pressing the brake pedal, and thus the vehicle system 2 is started.

The controller 16 consists of at least one electronic control unit (ECU) including a CPU, a ROM, a RAM, and the like. The CPU executes operation processing according to a program, and thus the controller 16 executes various types of vehicle control. The controller 16 may consist of one piece of hardware, or may consist of a unit including plural pieces of hardware. The functions of the controller 16 may be at least partially executed by hardware such as an LSI, an ASIC, and an FPGA, or may be executed by a combination of software and hardware.

The controller 16 includes an external environment recognizing unit 31 (an example of a delimiting line estimating unit), a movement amount calculating unit 32, a driving control unit 33, and a map processing unit 34. These components may be composed of separate electronic control units or integrated electronic control units.

The external environment recognizing unit 31 is configured to recognize an object that is present in the surroundings of the vehicle V based on the detection result of the external environment sensor 7, and thus acquire information on the position and size of the object. The object recognized by the external environment recognizing unit 31 includes delimiting lines, lanes, road ends, road shoulders, and obstacles, which are present on the travel route of the vehicle V. Each delimiting line is a line shown along a vehicle travel direction. Each lane is an area delimited by one or more delimiting lines. Each road end is an end of the travel route of the vehicle V. Each road shoulder is an area between the delimiting line arranged at an end in the vehicle width direction (lateral direction) and the road end. Each obstacle may be a barrier (guardrail), a utility pole, a surrounding vehicle, a pedestrian, or the like.

The external environment recognizing unit 31 is configured to recognize, based on the image (hereinafter referred to as "the camera image") captured by each external camera 18, the position of the delimiting line (hereinafter referred to as "the camera delimiting line") in the camera image. For example, the external environment recognizing unit 31 is configured to extract points (hereinafter referred to as "the candidate points") whose density value changes by a threshold or more in the camera image, and recognize a straight line passing through the candidate points as the camera delimiting line. The external environment recognizing unit 31 is configured to identify the type of the camera delimiting line based on the camera image. The type of the camera delimiting line includes a single solid line, a single broken line, a deceleration promotion line, and a double solid line. The deceleration promotion line consists of, for example, a broken line with shorter intervals and a greater width than the single broken line.

The movement amount calculating unit 32 is configured to calculate, based on the signal from the vehicle sensor 8, a movement amount of the vehicle V (a movement distance and a movement direction of the vehicle V) by using dead reckoning such as odometry and inertial navigation. For example, the movement amount calculating unit 32 is configured to calculate the movement amount of the vehicle V based on the rotational speed of each wheel detected by the wheel speed sensor, the acceleration of the vehicle V detected by the acceleration sensor, and the angular velocity of the vehicle V detected by the gyro sensor. Hereinafter, the movement amount of the vehicle V the movement amount calculating unit 32 calculates by using dead reckoning will be referred to as "the DR movement amount of the vehicle V".

The driving control unit 33 includes an action plan unit 41, a travel control unit 42, and a mode setting unit 43.

The action plan unit 41 is configured to create an action plan for causing the vehicle V to travel along the route set by the navigation device 11. The action plan unit 41 is configured to output a travel control signal corresponding to the created action plan to the travel control unit 42.

The travel control unit 42 is configured to control the powertrain 4, the brake device 5, and the steering device 6 based on the travel control signal from the action plan unit 41. Namely, the travel control unit 42 is configured to cause the vehicle V to travel according to the action plan created by the action plan unit 41.

The mode setting unit 43 is configured to switch the driving mode of the vehicle V between the manual driving mode and the autonomous driving mode. In the manual driving mode, the travel control unit 42 controls the powertrain 4, the brake device 5, and the steering device 6 according to the input operation on the driving operation member 12 by the occupant, thereby causing the vehicle V to travel. On the other hand, in the autonomous driving mode, the travel control unit 42 controls the powertrain 4, the brake device 5, and the steering device 6 regardless of the input operation on the driving operation member 12 by the occupant, thereby causing the vehicle V to travel autonomously.

The map processing unit 34 includes a map acquiring unit 51, a map storage unit 52, a local map generating unit 53 (an example of a map generating unit: hereinafter referred to as "the LM generating unit 53"), and a position identifying unit 54 (an example of an own vehicle position estimating unit).

The map acquiring unit 51 is configured to access the map server 3 and acquire dynamic map data (which will be described in detail later) from the map server 3. For example, the map acquiring unit 51 is configured to acquire, from the map server 3, the dynamic map data of an area corresponding to the route set by the navigation device 11.

The map storage unit 52 consists of a storage unit such as an HDD and an SSD. The map storage unit 52 is configured to store various kinds of information for causing the vehicle V to travel autonomously in the autonomous driving mode. The map storage unit 52 is configured to store the dynamic map data acquired by the map acquiring unit 51 from the map server 3.

The LM generating unit 53 is configured to generate a detailed map (hereinafter referred to as "the local map") of the surrounding area of the vehicle V based on the dynamic map data stored in the map storage unit 52. The LM generating unit 53 is configured to generate the local map by extracting the data relating to the surrounding area of the vehicle V from the dynamic map data. Accordingly, the local map may include any information included in the dynamic map data. For example, the local map includes information on the lanes (for example, the number of lanes and the lane number of each lane) on the travel route and information on each delimiting line (for example, the type of the delimiting line) on the travel route. Further, the local map may include information on the object (for example, the obstacle) recognized by the external environment recognizing unit 31 based on the camera image and information on the past DR movement amount of the vehicle V (namely, the movement trajectory of the vehicle V). When the vehicle V is traveling autonomously in the autonomous driving mode, the LM generating unit 53 may update the local map at any time according to the travel position of the vehicle V.

The position identifying unit 54 is configured to execute various kinds of localization processes on the local map. For example, the position identifying unit 54 is configured to estimate the position of the vehicle V on the local map based on the GNSS signal output from the GNSS receiver 10, the DR movement amount of the vehicle V, the camera image, and the like. Further, the position identifying unit 54 is configured to identify the position of an own lane (a lane in which the vehicle V is traveling) on the local map based on the GNSS signal output from the GNSS receiver 10, the camera image, and the like. When the vehicle V is traveling autonomously in the autonomous driving mode, the position identifying unit 54 may update the position of the vehicle V and the position of the own lane on the local map at any time according to the travel position of the vehicle V.

<The Map Server 3>

Next, the map server 3 will be described. As shown in FIG. 1, the map server 3 is connected to the controller 16 via the network N (in the present embodiment, the Internet) and the communication device 9. The map server 3 is a computer including a CPU, a ROM, a RAM, and a storage unit such as an HDD and an SSD. The dynamic map data is stored in the storage unit of the map server 3.

The dynamic map data includes static information, semi-static information, semi-dynamic information, and dynamic information. The static information includes 3D map data that is more precise than the navigation map data. The semi-static information includes traffic regulation information, road construction information, and wide area weather information. The semi-dynamic information includes accident information, traffic congestion information, and small area weather information. The dynamic information includes signal information, surrounding vehicle information, and pedestrian information.

The static information of the dynamic map data includes information on lanes (for example, the number of lanes and the lane number of each lane) on the travel route and information on each delimiting line on the travel route (for example, the type of the delimiting line). For example, the delimiting line in the static information is represented by nodes arranged at prescribed intervals and links connecting the nodes.

<The Delimiting Line Estimating Control>

Figure 2:
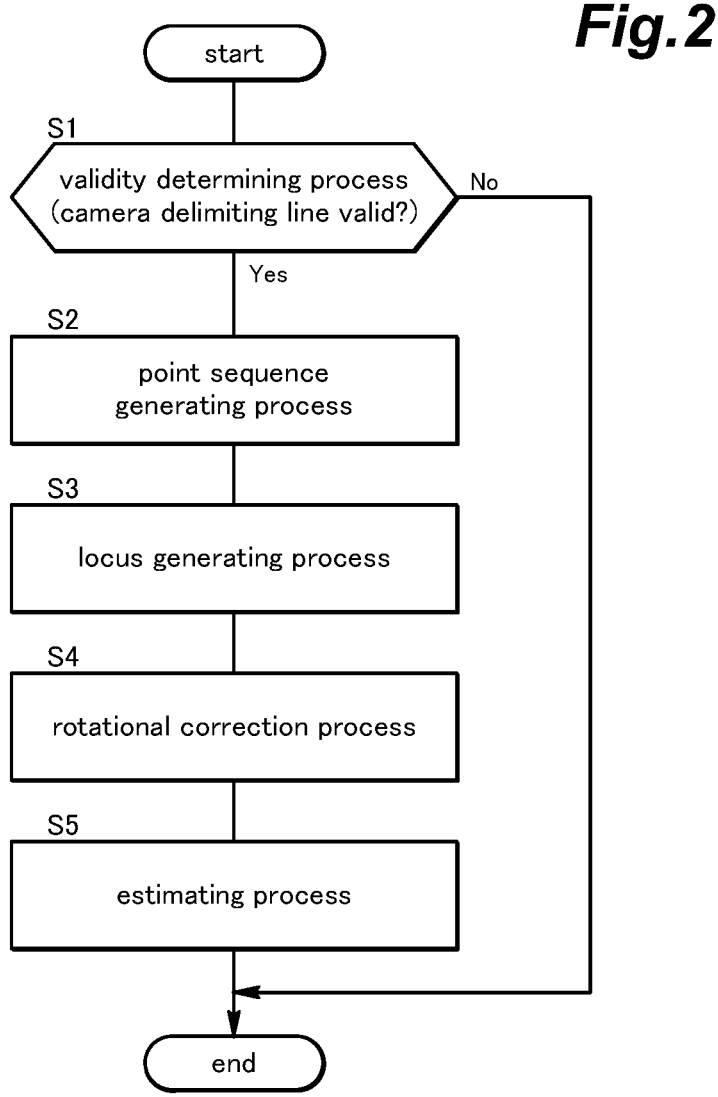
FIG. 2 is a flowchart showing delimiting line estimating control according to the embodiment of the present invention.

Next, an outline of delimiting line estimating control (an example of a delimiting line estimating method) for estimating the positions of the delimiting lines on the travel route based on the camera image will be described with reference to FIG. 2. The external environment recognizing unit 31 of the controller 16 executes the delimiting line estimating control for the delimiting lines on both lateral sides (left and right sides) of the vehicle V, respectively. In the following, only the delimiting line estimating control executed for the delimiting line on the left side of the vehicle V will be described, and the description of the delimiting line estimating control executed for the delimiting line on the right side of the vehicle V will be omitted.

When the delimiting line estimating control is started, the external environment recognizing unit 31 executes a validity determining process (step S1). In the validity determining process, the external environment recognizing unit 31 determines whether the camera delimiting line is valid. Upon determining that the camera delimiting line is invalid in the validity determining process (step S1: No), the external environment recognizing unit 31 terminates the delimiting line estimating control without estimating the position of the delimiting line on the travel route.

On the other hand, upon determining that the camera delimiting line is valid in the validity determining process (step S1: Yes), the external environment recognizing unit 31 executes a point sequence generating process (step S2). In the point sequence generating process, the external environment recognizing unit 31 generates a first delimiting point sequence P1 and a second delimiting point sequence P2, and then generates a corrected delimiting point sequence P3 based on the first delimiting point sequence P1 and the second delimiting point sequence P2.

Next, the external environment recognizing unit 31 executes a locus generating process (step S3). In the locus generating process, the external environment recognizing unit 31 generates a locus of a point right next to the vehicle V on the first delimiting point sequence P1.

Next, the external environment recognizing unit 31 executes a rotational correction process (step S4). In the rotational correction process, the external environment recognizing unit 31 rotates the corrected delimiting point sequence P3 according to a deviation amount of the corrected delimiting point sequence P3 from the locus of the point right next to the vehicle V, thereby correcting the corrected delimiting point sequence P3.

Next, the external environment recognizing unit 31 executes an estimating process (step S5). In the estimating process, the external environment recognizing unit 31 estimates the position of the delimiting line on the travel route based on the corrected delimiting point sequence P3 rotated in the rotational correction process or the corrected delimiting point sequence P3 before rotation in the rotational correction process, and outputs the estimated position of the delimiting line on the travel route to the travel control unit 42 and the position identifying unit 54.

<The Validity Determining Process>

Figure 3:
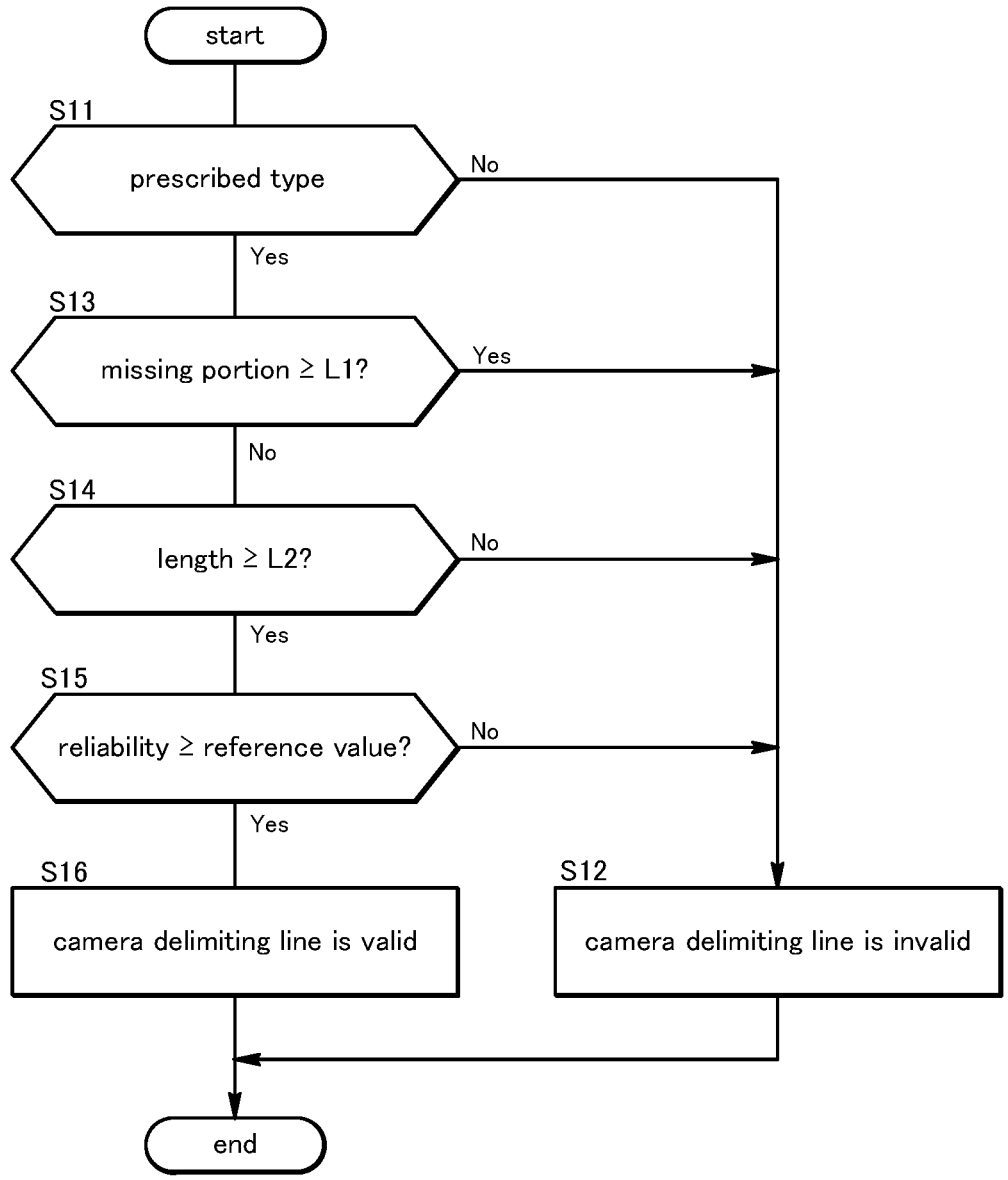
FIG. 3 is a flowchart showing a validity determining process according to the embodiment of the present invention.

Next, the validity determining process (step S1) of the delimiting line estimating control will be described with reference to FIG. 3.

When the validity determining process is started, the external environment recognizing unit 31 determines whether the type of the camera delimiting line is a prescribed type (for example, the single solid line or the single broken line) (step S11). In a case where the type of the camera delimiting line is not the prescribed type (step S11: No), the external environment recognizing unit 31 determines that the camera delimiting line is invalid (step S12).

On the other hand, in a case where the type of the camera delimiting line is the prescribed type (step S11: Yes), the external environment recognizing unit 31 determines whether the camera delimiting line includes a missing portion having a first length L1 or more (whether there is a gap in the camera delimiting line) (step S13). In a case where the camera delimiting line includes the missing portion having the first length L1 or more (step S13: Yes), the external environment recognizing unit 31 determines that the camera delimiting line is invalid (step S12).

On the other hand, in a case where the camera delimiting line does not include the missing portion having the first length L1 or more (step S13: No), the external environment recognizing unit 31 determines whether the length (total length) of the camera delimiting line is a second length L2 (L2>L1) or more (step S14). In a case where the length of the camera delimiting line is less than the second length L2

(step S14: No), the external environment recognizing unit 31 determines that the camera delimiting line is invalid (step S12).

On the other hand, in a case where the length of the camera delimiting line is the second length L2 or more (step S14: Yes), the external environment recognizing unit 31 calculates the reliability of the camera delimiting line. For example, the external environment recognizing unit 31 may calculate the reliability of the camera delimiting line based on the number of candidate points on the camera delimiting line. In this case, the external environment recognizing unit 31 may increase the reliability of the camera delimiting line as the number of candidate points on the camera delimiting line increases. Alternatively, the external environment recognizing unit 31 may calculate the reliability of the camera delimiting line based on the length of a period in which the camera delimiting line is continuously recognized. In this case, the external environment recognizing unit 31 may increase the reliability of the camera delimiting line as the period in which the camera delimiting line is continuously recognized is lengthened.

Next, the external environment recognizing unit 31 determines whether the calculated reliability of the camera delimiting line is a reference value or more (step S15). In a case where the reliability of the camera delimiting line is less than the reference value (step S15: No), the external environment recognizing unit 31 determines that the camera delimiting line is invalid (step S12). On the other hand, in a case where the reliability of the camera delimiting line is the reference value or more (step S15: Yes), the external environment recognizing unit 31 determines that the camera delimiting line is valid (step S16).

In another embodiment, the external environment recognizing unit 31 may execute the validity determining process by using only a part of the above determination criteria (see steps S11 and S13-15), or by using another determination criterion (for example, whether the type of the camera delimiting line is constant) in addition to the above determination criteria.

<The Point Sequence Generating Process>

Next, the point sequence generating process (step S2) of the delimiting line estimating control will be described with reference to FIG. 4. Hereinafter, the word "front (forward)" and the word "rear (rearward)" will indicate "front (forward)" and "rear (rearward)" in a vehicle travel direction X respectively.

When the point sequence generating process is started, the external environment recognizing unit 31 generates the first delimiting point sequence P1 based on the camera image (the latest camera image) at a time when the vehicle V is traveling in a first position A1. The first delimiting point sequence P1 extends forward from a point right next to the vehicle V in the first position A1. The first delimiting point sequence P1 includes a plurality of first delimiting points Q1 (indicated by triangular points in FIG. 4) arranged at regular intervals Z in the vehicle travel direction X. Each first delimiting point Q1 is a point on the camera delimiting line recognized from the camera image at the time when the vehicle V is traveling in the first position A1.

Further, the external environment recognizing unit 31 generates the second delimiting point sequence P2 based on the camera image (the camera image one sample before the latest camera image) at a time when the vehicle V is traveling in a second position A2. Since the second position A2 is arranged more rearward than the first position A1 by a distance Y, the second delimiting point sequence P2 is offset rearward by the distance Y with respect to the first delimiting point sequence P1. The position of the second delimiting point sequence P2 in the vehicle travel direction X partially overlaps with the position of the first delimiting point sequence P1 in the vehicle travel direction X. The second delimiting point sequence P2 includes a plurality of second delimiting points Q2 (indicated by square points in FIG. 4) arranged at the regular intervals Z in the vehicle travel direction X. Each second delimiting point Q2 is a point on the camera delimiting line recognized from the camera image at the time when the vehicle V is traveling in the second position A2.

As the vehicle V moves forward by the distance Y from the second position A2 to the first position A1, the second delimiting point sequence P2 also moves forward by the distance Y. Accordingly, the starting point (namely, the second delimiting point Q2 at the rear end) of the second delimiting point sequence P2 is offset forward by the distance Y with respect to the second position A2. Considering this offset, the external environment recognizing unit 31 moves the second delimiting point sequence P2 rearward by the distance Y when the vehicle V moves forward by the distance Y from the second position A2 to the first position A1. In FIG. 4, the second delimiting point sequence P2 after such a rearward movement is shown.

Next, the external environment recognizing unit 31 generates the corrected delimiting point sequence P3 by compositing (integrating) the first delimiting point sequence P1 and the second delimiting point sequence P2. The corrected delimiting point sequence P3 includes a plurality of corrected delimiting points Q3 (indicated by round points in FIG. 4) arranged at the regular intervals Z in the vehicle travel direction X. The position of each corrected delimiting point Q3 in the vehicle travel direction X matches the positions of each first delimiting point Q1 and each second delimiting point Q2 in the vehicle travel direction X. The position of the end point (namely, the corrected delimiting point Q3 at the front end) of the corrected delimiting point sequence P3 in the vehicle travel direction X matches the position of the end point (namely, the first delimiting point Q1 at the front end) of the first delimiting point sequence P1 in the vehicle travel direction X. The starting point (namely, the corrected delimiting point Q3 at the rear end) of the corrected delimiting point sequence P3 is offset rearward with respect to the starting point (namely, the first delimiting point Q1 at the rear end) of the first delimiting point sequence P1. In this way, the corrected delimiting point sequence P3 extends more rearward than the first delimiting point sequence P1.

A section B in FIG. 4 indicates a section (hereinafter referred to as "the overlapping section B") in which the positions of the first delimiting point sequence P1 and the second delimiting point sequence P2 in the vehicle travel direction X overlap with each other. In this overlapping section B, the external environment recognizing unit 31 generates the corrected delimiting point sequence P3 such that a ratio of a first distance (L3, L4, . . . , L7, L8) to a second distance (M3, M4, . . . , M7, M8) is constant, wherein the first distance is a distance from each first delimiting point Q1 to each corrected delimiting point Q3, and the second distance is a distance from each second delimiting point Q2 to each corrected delimiting point Q3. Namely, in FIG. 4, L3:M3=L4:M4==L7:M7=L8:M8. For example, the ratio of the first distance to the second distance is 1:1.

A section C1 in FIG. 4 indicates a section (hereinafter referred to as "the first non-overlapping section C1") in which the first delimiting point sequence P1 is present but the second delimiting point sequence P2 is absent. In this first non-overlapping section C1, the external environment recognizing unit 31 generates the corrected delimiting point sequence P3 such that a third distance and a fourth distance match each other, wherein the third distance is a distance from the first delimiting point Q1 to the corrected delimiting point Q3 at a third position A3 (the closest position to the first non-overlapping section C1 in the overlapping section B), and the fourth distance is a distance from each first delimiting point Q1 to each corrected delimiting point Q3 in the first non-overlapping section C1. Namely, in FIG. 4, L8=L9=L10.

A section C2 in FIG. 4 indicates a section (hereinafter referred to as "the second non-overlapping section C2") in which the second delimiting point sequence P2 is present but the first delimiting point sequence P1 is absent. In this second non-overlapping section C2, the external environment recognizing unit 31 generates the corrected delimiting point sequence P3 such that the other third distance and the other fourth distance match each other, wherein the other third distance is a distance from the second delimiting point Q2 to the corrected delimiting point Q3 at the first position A1 (the closest position to the second non-overlapping section C2 in the overlapping section B), and the other fourth distance is a distance from each second delimiting point Q2 to each corrected delimiting point Q3 in the second non-overlapping section C2. Namely, in FIG. 4, M1=M2=M3.

<The Locus Generating Process>

Next, the locus generating process (step S3) of the delimiting line estimating control will be described with reference to FIGS. 4 and 5.

Figure 4:
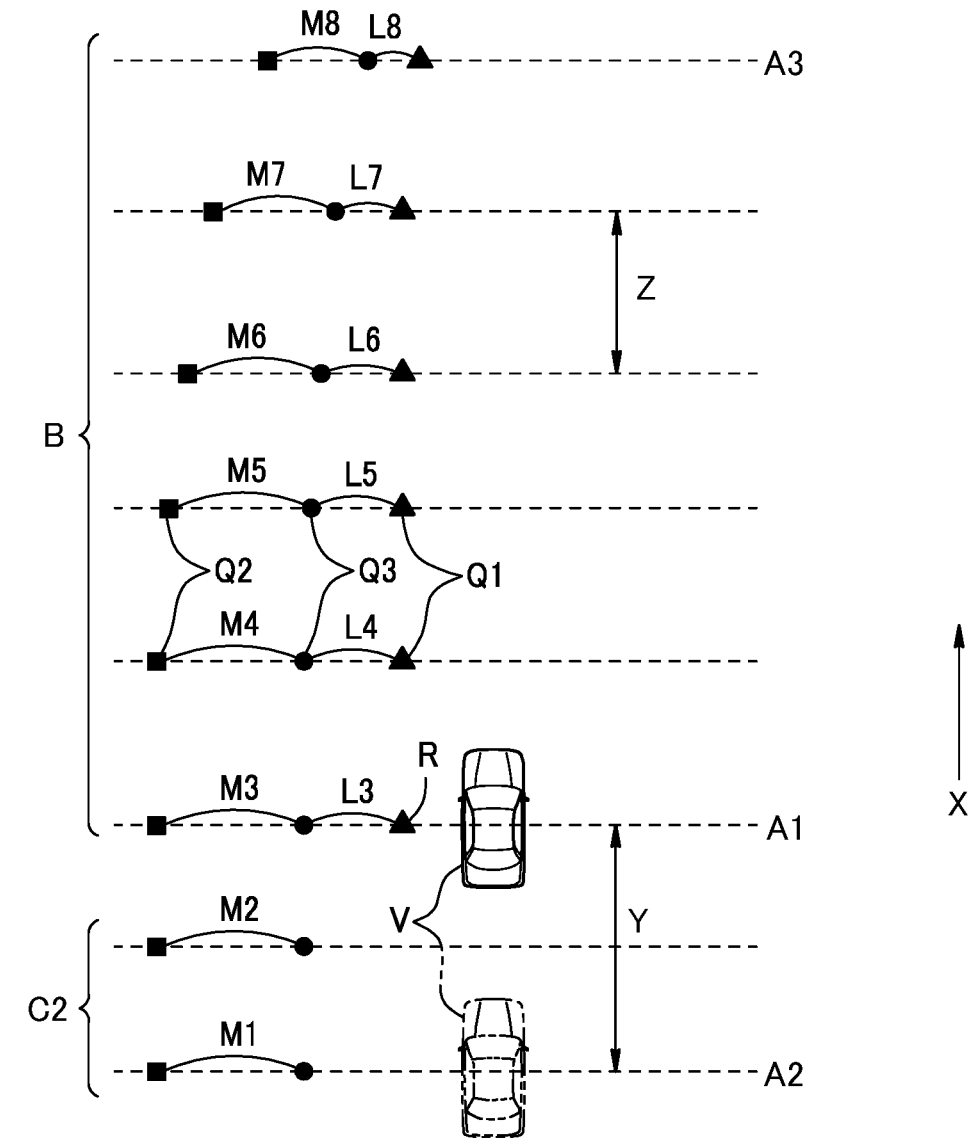
FIG. 4 is a plan view showing a point sequence generating process according to the embodiment of the present invention.

With reference to FIG. 4, each time generating the first delimiting point sequence P1, the external environment recognizing unit 31 causes a storage area (not shown) in the controller 16 to store a point R (hereinafter referred to as "the reference point R") right next to the vehicle V on the first delimiting point sequence P1. Namely, the external environment recognizing unit 31 buffers the reference point R.

Figure 5:
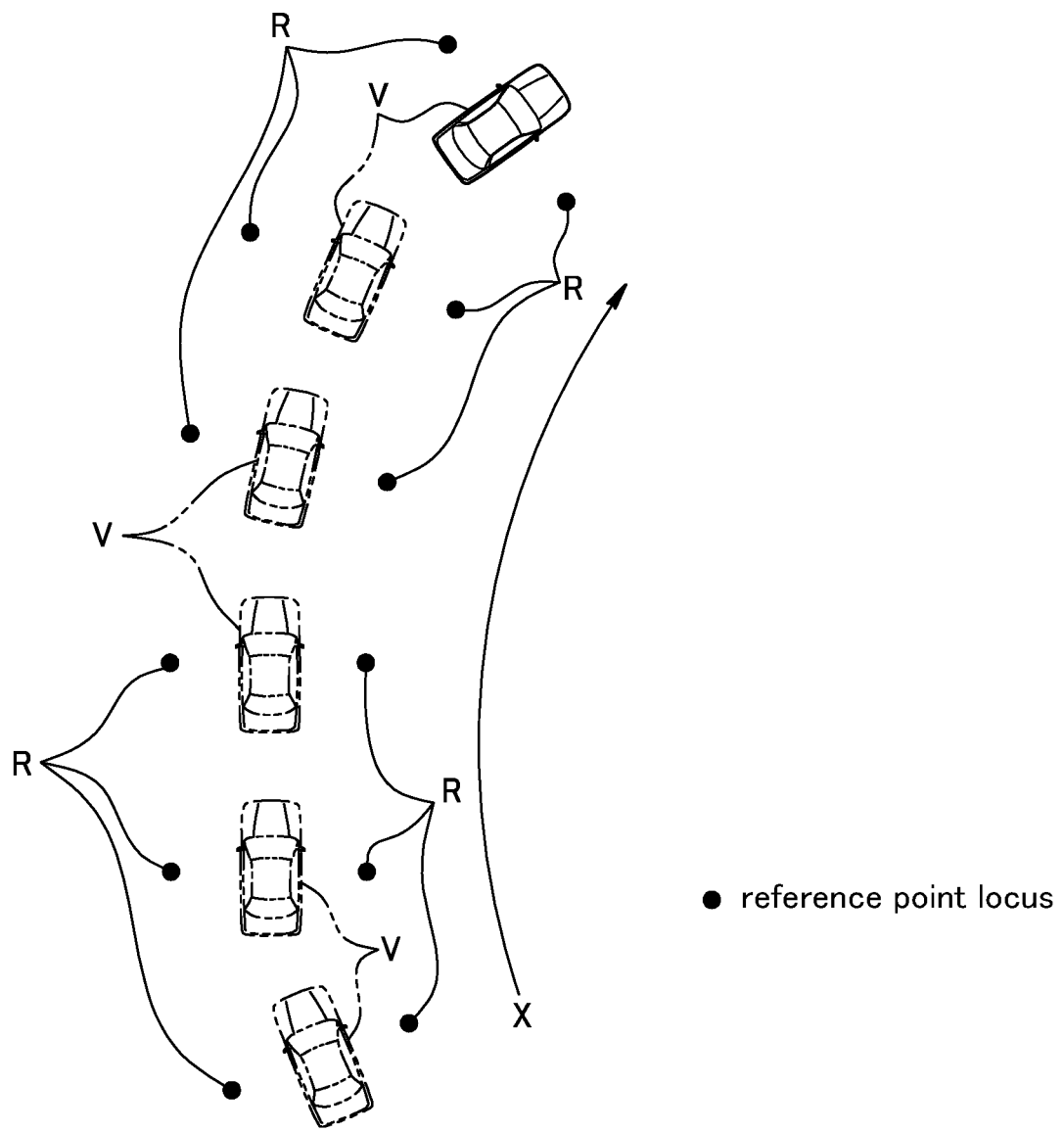
FIG. 5 is a plan view showing a locus generating process according to the embodiment of the present invention.

With reference to FIG. 5, the external environment recognizing unit 31 generates a locus of the reference point R (hereinafter referred to as "the reference point locus") by arranging the reference point R at each time stored in the storage area. The position of the starting point (namely, the reference point R at the rear end) of the reference point locus in the vehicle travel direction X matches the position of the starting point (namely, the corrected delimiting point Q3 at the rear end) of the corrected delimiting point sequence P3 in the vehicle travel direction X.

<The Rotational Correction Process>

Figure 6:
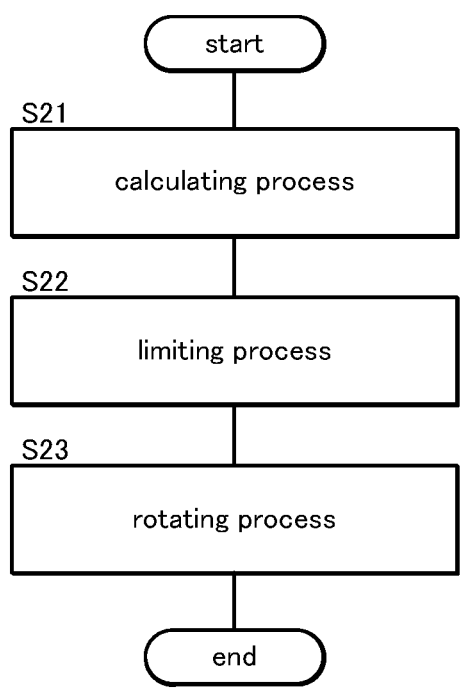
FIG. 6 is a flowchart showing a rotational correction process according to the embodiment of the present invention.

Next, the rotational correction process (step S4) of the delimiting line estimating control will be described with reference to FIG. 6.

When the rotational correction process is started, the external environment recognizing unit 31 executes a calculating process (step S21). In the calculating process, the external environment recognizing unit 31 calculates a deviation amount (hereinafter referred to as "the reference deviation amount") of the corrected delimiting point sequence P3 from the reference point locus. For example, the external environment recognizing unit 31 may calculate the reference deviation amount based on the maximum value or the sum of the deviation amount of each corrected delimiting point Q3 from each reference point R. Next, the external environment recognizing unit 31 calculates a rotational correction amount of the corrected delimiting point sequence P3 according to the reference deviation amount. For example, the external environment recognizing unit 31 may increase the rotational correction amount as the reference deviation amount increases.

Next, the external environment recognizing unit 31 executes a limiting process (step S22). In the limiting process, in a case where the rotational correction amount calculated in the calculating process exceeds a prescribed threshold, the external environment recognizing unit 31 removes an excess of the rotational correction amount over the threshold. Namely, the external environment recognizing unit 31 limits the rotational correction amount to the threshold or less.

Next, the external environment recognizing unit 31 executes a rotating process (step S23). In the rotating process, the external environment recognizing unit 31 corrects the corrected delimiting point sequence P3 by rotating the corrected delimiting point sequence P3 by the rotational correction amount in the direction in which the reference deviation amount decreases. At this time, the external environment recognizing unit 31 may rotate the corrected delimiting point sequence P3 around the corrected delimiting point Q3 at the first position A1.

<The Estimating Process>

Figure 7:
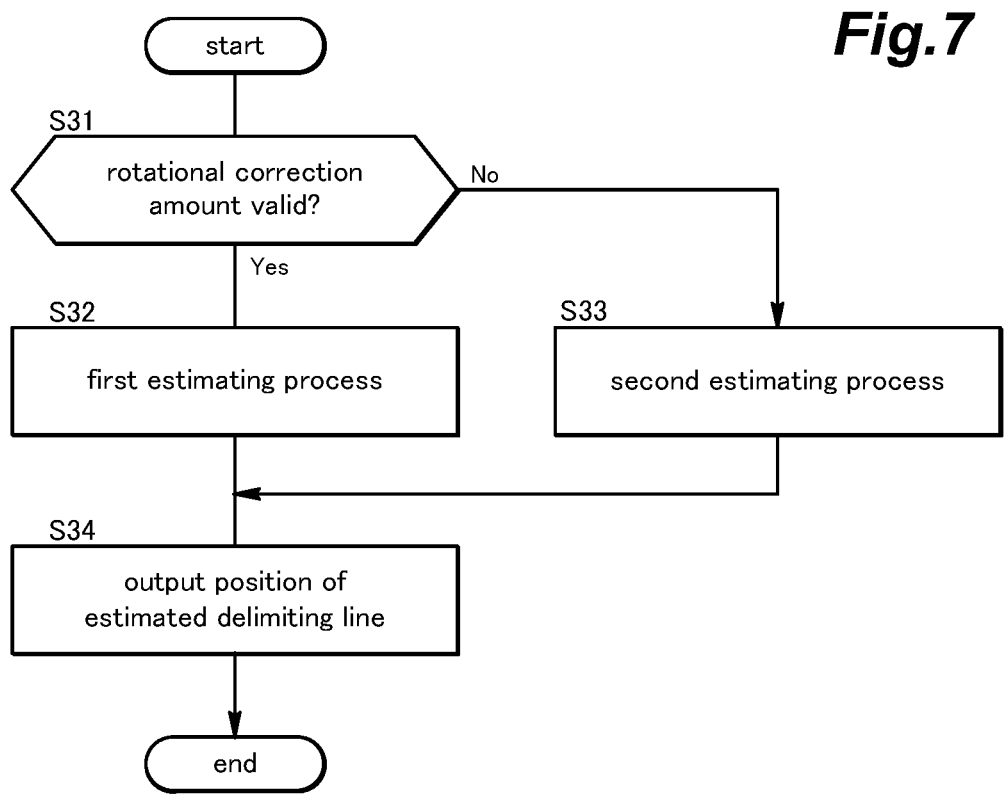
FIG. 7 is a flowchart showing an estimating process according to the embodiment of the present invention.

Next, the estimating process (step S5) of the delimiting line estimating control will be described with reference to FIG. 7.

When the estimating process is started, the external environment recognizing unit 31 determines whether the rotational correction amount calculated in the calculating process (step S21) is valid (step S31). At this time, the external environment recognizing unit 31 may determine whether the rotational correction amount is valid based on the number of reference points R constituting the reference point locus, the total length of the corrected delimiting point sequence P3, an evaluation value of the reference deviation amount, or the like. For example, in a case where the number of reference points R constituting the reference point locus is a prescribed number or more, the external environment recognizing unit 31 may determine that the rotational correction amount is valid. On the other hand, in a case where the number of reference points R constituting the reference point locus is less than the prescribed number, the external environment recognizing unit 31 may determine that the rotational correction amount is invalid.

In a case where the rotational correction amount is valid (step S31: Yes), the external environment recognizing unit 31 executes a first estimating process (step S32). In the first estimating process, the external environment recognizing unit 31 estimates the position of the delimiting line on the travel route based on the corrected delimiting point sequence P3 rotated in the rotating process (step S23). For example, the external environment recognizing unit 31 may estimate the position of a straight line or a curve, which passes through the corrected delimiting point sequence P3 rotated in the rotating process, as the position of the delimiting line on the travel route. Alternatively, the external environment recognizing unit 31 may estimate the position of an approximate straight line or an approximate curve, which is generated based on the corrected delimiting point sequence P3 rotated in the rotating process, as the position of the delimiting line on the travel route.

On the other hand, in a case where the rotational correction amount is invalid (step S31: No), the external environment recognizing unit 31 executes a second estimating process (step S33). In the second estimating process, the external environment recognizing unit 31 estimates the position of the delimiting line on the travel route based on the corrected delimiting point sequence P3 before the rotation in the rotating process (step S23). For example, in the second estimating process, the external environment recognizing unit 31 may estimate the position of a straight line or a curve, which passes through the corrected delimiting point sequence P3 before the rotation in the rotating process, as the position of the delimiting line on the travel route. Alternatively, the external environment recognizing unit 31 may estimate the position of an approximate straight line or an approximate curve, which is generated based on the corrected delimiting point sequence P3 before the rotation in the rotating process, as the position of the delimiting line on the travel route.

Next, the external environment recognizing unit 31 outputs the position of the delimiting line (hereinafter referred to as "the estimated delimiting line") on the travel route, which is estimated in the first estimating process (step S32) or the second estimating process (step S33), to the travel control unit 42 and the position identifying unit 54 (step S34).

<The Control Based on the Position of the Estimated Delimiting Line>

When the position of the estimated delimiting line is output from the external environment recognizing unit 31, the travel control unit 42 estimates the position of the own lane on the travel route based on the position of the estimated delimiting line, and then executes lane keeping assistance control based on the estimated position of the own lane on the travel route. In the lane keeping assistance control, the travel control unit 42 controls the steering device 6 and the steering wheel such that the vehicle V travels on the estimated own lane on the travel route.

When the position of the estimated delimiting line is output from the external environment recognizing unit 31, the position identifying unit 54 estimates the position of the vehicle V on the local map by comparing the position of the estimated delimiting line with the position of the delimiting line on the local map. For example, on the local map, the position identifying unit 54 matches the position of the estimated delimiting line with the position of the delimiting line on the local map, and then estimates the position of the vehicle V on the local map based on the positional relationship between the vehicle V and the estimated delimiting line.

<Effect>

In the present embodiment, the external environment recognizing unit 31 is configured to estimate the position of the delimiting line on the travel route based on the corrected delimiting point sequence P3, which extends more rearward than the first delimiting point sequence P1. Accordingly, it is possible to extend the distance of a section where the position of the delimiting line on the travel route can be estimated as compared with a case where the position of the delimiting line on the travel route is estimated based on the first delimiting point sequence P1 itself. Further, the external environment recognizing unit 31 is configured to estimate the position of the delimiting line on the travel route based on not only the first delimiting point sequence P1 but also the second delimiting point sequence P2. Accordingly, it is possible to prevent the estimation accuracy of the position of the delimiting line on the travel route from decreasing due to the noise contained in the camera image at the time when the vehicle is traveling in the first position A1.

Also, the external environment recognizing unit 31 is configured to generate the corrected delimiting point sequence P3 in the overlapping section B (the section in which the positions of the first delimiting point sequence P1 and the second delimiting point sequence P2 in the vehicle travel direction X overlap with each other) such that the ratio of the first distance to the second distance is constant, wherein the first distance is a distance from each first delimiting point Q1 to each corrected delimiting point Q3, and the second distance is a distance from each second delimiting point Q2 to each corrected delimiting point Q3. Accordingly, in the overlapping section B, the corrected delimiting point sequence P3 can be generated at an appropriate position.

Also, the external environment recognizing unit 31 is configured to generate the corrected delimiting point sequence P3 in each of the first and second non-overlapping sections C1, C2 (the sections in which the positions of the first delimiting point sequence P1 and the second delimiting point sequence P2 in the vehicle travel direction X do not overlap with each other) such that the third distance and the fourth distance match each other, wherein the third distance is a distance from one of the first delimiting point Q1 and the second delimiting point Q2 to the corrected delimiting point Q3 at the closest position to each of the first and second non-overlapping sections C1, C2 in the overlapping section B, and the fourth distance is a distance from the one of the first delimiting point Q1 and the second delimiting point Q2 to the corrected delimiting point Q3 in each of the first and second non-overlapping sections C1, C2. Accordingly, not only in the overlapping section B but also in each of the non-overlapping sections C1, C2, the corrected delimiting point sequence P3 can be generated at an appropriate position.

Also, the external environment recognizing unit 31 is configured to calculate the rotational correction amount of the corrected delimiting point sequence P3 according to the reference deviation amount, and estimate the position of the delimiting line on the travel route based on the corrected delimiting point sequence P3 that has been rotated by the rotational correction amount. Accordingly, it is possible to suppress the deviation of an angle of the corrected delimiting point sequence P3 from an angle of the delimiting line on the travel route.

Also, in a case where the rotational correction amount of the corrected delimiting point sequence P3 exceeds the prescribed threshold, the external environment recognizing unit 31 removes an excess of the rotational correction amount of the corrected delimiting point sequence P3 over the threshold. Accordingly, it is possible to keep the rotational correction amount of the corrected delimiting point sequence P3 within the threshold, and prevent the position of the corrected delimiting point sequence P3 after rotation from being excessively deviated from the position of the corrected delimiting point sequence P3 before rotation.

Also, the external environment recognizing unit 31 is configured to generate the corrected delimiting point sequence P3 only when determining that the camera delimiting line is valid. Accordingly, it is possible to prevent the corrected delimiting point sequence P3 from being generated based on a camera delimiting line whose validity is insufficient (for example, a camera delimiting line whose length is insufficient).

Also, the travel control unit 42 is configured to execute the lane keeping assistance control based on the position of the estimated delimiting line that is accurately estimated based on the corrected delimiting point sequence P3. Accordingly, the effectiveness of the lane keeping assistance control can be enhanced.

Also, the position identifying unit 54 is configured to compare the position of the estimated delimiting line estimated based on the corrected delimiting point sequence P3

(the delimiting point sequence extending more rearward than the first delimiting point sequence P1) with the position of the delimiting line on the local map. Accordingly, it is possible to sufficiently ensure the comparing distance of these two positions, so that it is possible to accurately estimate the position of the vehicle V on the local map.

Concrete embodiments of the present invention have been described in the foregoing, but the present invention should not be limited by the foregoing embodiments and various modifications and alterations are possible within the scope of the present invention.

The invention claimed is:

1. A vehicle, comprising:
a camera configured to capture an image of a travel route on which the vehicle is traveling;
a delimiting line estimating unit configured to estimate a position of a delimiting line on the travel route based on the image captured by the camera; and
a mode setting unit configured to switch a driving mode of the vehicle between a manual driving mode and an autonomous driving mode,
wherein the delimiting line estimating unit is configured to
generate a first delimiting point sequence based on the image captured by the camera when the vehicle is traveling in a first position,
generate a second delimiting point sequence based on the image captured by the camera when the vehicle is traveling in a second position arranged more rearward than the first position in a vehicle travel direction, the second delimiting point sequence being offset rearward in the vehicle travel direction with respect to the first delimiting point sequence,
generate a corrected delimiting point sequence based on the first delimiting point sequence and the second delimiting point sequence, the corrected delimiting point sequence extending more rearward in the vehicle travel direction than the first delimiting point sequence, and
estimate the position of the delimiting line on the travel route based on the corrected delimiting point sequence,
wherein the first delimiting point sequence, the second delimiting point sequence, and the corrected delimiting point sequence include a plurality of first delimiting points, a plurality of second delimiting points, and a plurality of corrected delimiting points respectively, and
the delimiting line estimating unit is configured to generate the corrected delimiting point sequence in an overlapping section such that a ratio of a first distance to a second distance is constant, the overlapping section being a section in which the positions of the first delimiting point sequence and the second delimiting point sequence in the vehicle travel direction overlap with each other, the first distance being a distance from each first delimiting point to each corrected delimiting point, the second distance being a distance from each second delimiting point to each corrected delimiting point.

2. The vehicle according to claim 1, wherein the delimiting line estimating unit is configured to generate the corrected delimiting point sequence in a non-overlapping section such that a third distance and a fourth distance match each other, the non-overlapping section being a section in which the positions of the first delimiting point sequence and the second delimiting point sequence in the vehicle travel direction do not overlap with each other, the third distance being a distance from one of the first delimiting point and the second delimiting point to the corrected delimiting point at a closest position to the non-overlapping section in the overlapping section, the fourth distance being a distance from the one of the first delimiting point and the second delimiting point to the corrected delimiting point in the non-overlapping section.

3. The vehicle according to claim 1, wherein the first delimiting point sequence includes a reference point which is a point right next to the vehicle, and
the delimiting line estimating unit is configured to
generate a reference point locus which is a locus of the reference point,
calculate a rotational correction amount of the corrected delimiting point sequence according to a deviation amount of the corrected delimiting point sequence from the reference point locus,
rotate the corrected delimiting point sequence by the rotational correction amount, and
estimate the position of the delimiting line on the travel route based on the corrected delimiting point sequence that has been rotated.

4. The vehicle according to claim 3, wherein in a case where the rotational correction amount exceeds a prescribed threshold, the delimiting line estimating unit removes an excess of the rotational correction amount over the threshold.

5. The vehicle according to claim 1, wherein the camera is an external camera, and
the delimiting line estimating unit is configured to
determine whether a camera delimiting line is valid, the camera delimiting line being the delimiting line recognized based on an image captured by the external camera, and
generate the corrected delimiting point sequence only when determining that the camera delimiting line is valid.

6. The vehicle according to claim 1, further comprising a travel control unit configured to execute lane keeping assistance control based on the position of the delimiting line on the travel route estimated by the delimiting line estimating unit.

7. The vehicle according to claim 1, further comprising:
a map generating unit configured to generate a map of a surrounding area of the vehicle, and
an own vehicle position estimating unit configured to estimate a position of the vehicle on the map by comparing the position of the delimiting line on the travel route estimated by the delimiting line estimating unit with the position of the delimiting line on the map.

8. The vehicle according to claim 7, wherein the own vehicle position estimating unit is configured to update the position of the vehicle on the map when the vehicle is traveling autonomously in the autonomous driving mode.

* * * * *